(12) United States Patent
Jain et al.

(10) Patent No.: US 10,958,590 B2
(45) Date of Patent: Mar. 23, 2021

(54) DYNAMIC RESIZING OF WEBSERVER CONNECTION POOL SIZE

(71) Applicant: Adobe Inc., San Jose, CA (US)

(72) Inventors: Mayur Jain, Bangalore (IN); Nikhil Siddhartha, Patna (IN)

(73) Assignee: ADOBE INC., San Jose, CA (US)

(*) Notice: Subject to any disclaimer, the term of this patent is extended or adjusted under 35 U.S.C. 154(b) by 0 days.

(21) Appl. No.: 16/408,174

(22) Filed: May 9, 2019

(65) Prior Publication Data

US 2020/0358713 A1 Nov. 12, 2020

(51) Int. Cl.
| | |
|---|---|
| *H04L 12/917* | (2013.01) |
| *H04L 12/911* | (2013.01) |
| *H04L 12/24* | (2006.01) |
| *H04L 12/861* | (2013.01) |

(52) U.S. Cl.
CPC .............. *H04L 47/76* (2013.01); *H04L 41/22* (2013.01); *H04L 47/781* (2013.01); *H04L 47/822* (2013.01); *H04L 47/823* (2013.01); *H04L 47/826* (2013.01); *H04L 49/9005* (2013.01)

(58) Field of Classification Search
None
See application file for complete search history.

(56) References Cited

U.S. PATENT DOCUMENTS

| | | | | |
|---|---|---|---|---|
| 2015/0288759 A1* | 10/2015 | Luna | ....................... | G06F 9/542 709/203 |
| 2018/0019922 A1* | 1/2018 | Robison | ................ | H04L 47/826 |
| 2018/0123939 A1* | 5/2018 | Raman | .................. | H04L 47/828 |
| 2018/0248871 A1* | 8/2018 | Tsirkin | ................ | H04L 63/0876 |
| 2019/0020629 A1* | 1/2019 | Baird, III | .............. | H04W 12/02 |

* cited by examiner

*Primary Examiner* — Jeffrey R Swearingen
(74) *Attorney, Agent, or Firm* — Keller Jolley Preece

(57) ABSTRACT

The present disclosure relates to systems, non-transitory computer-readable media, and methods for dynamically updating the connection pool for a web server without any interruption to the resource. In particular, in one or more embodiments, the disclosed systems can continuously monitor load data for various web servers. Further, the disclosed systems can utilize load data, historical load data, and/or user settings to predict a number of connections over a future time period and can determine an updated connection pool size for a web server based on that predicted number of connections. The disclosed systems can also dynamically modify the connection pool size for the web server based on the updated connection pool size without interrupting the resource or any of its ongoing connections in any way.

20 Claims, 9 Drawing Sheets

DYNAMIC RESIZING OF WEBSERVER CONNECTION POOL SIZE

BACKGROUND

Recent years have seen significant improvements in the field of online resource management. Due to various advances, conventional online resource management systems are now able to service large numbers of connections at web servers. Conventional systems can utilize a configuration file to initialize settings for a web server. More specifically, conventional systems can utilize a configuration file to allot a number of allocated connections available for a web server at the time that the connections are initialized. Further, conventional systems are able to modify settings for web servers by taking the web server offline and manually modifying the configuration file. Then, when conventional systems re-start the web server, the updated settings are in effect.

BRIEF SUMMARY

One or more embodiments of the present disclosure provide benefits and/or solve one or more of problems in the art with systems, non-transitory computer-readable media, and methods that can dynamically tune a connection pool size of a web server. More specifically, in one or more embodiments, the disclosed systems can monitor the traffic and health of a web server to determine how many connections to allocate to the web server. Further, the disclosed systems and methods can dynamically modify the number of connections allocated to a web server. Furthermore, the disclosed systems can dynamically modify the connection pool size of a web server without taking the web server offline.

To illustrate, the disclosed systems and methods can detect an increase in the number of connections to a web server over a time period. Then, based on that detected increase and based on historical request trends, the systems and methods can determine a predicted number of connections over a future time period. If the predicted number of connections exceeds a threshold number of allocated connections, the systems and methods can dynamically increase the number of allocated connections for the web server without restarting the web server or taking the web server offline.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
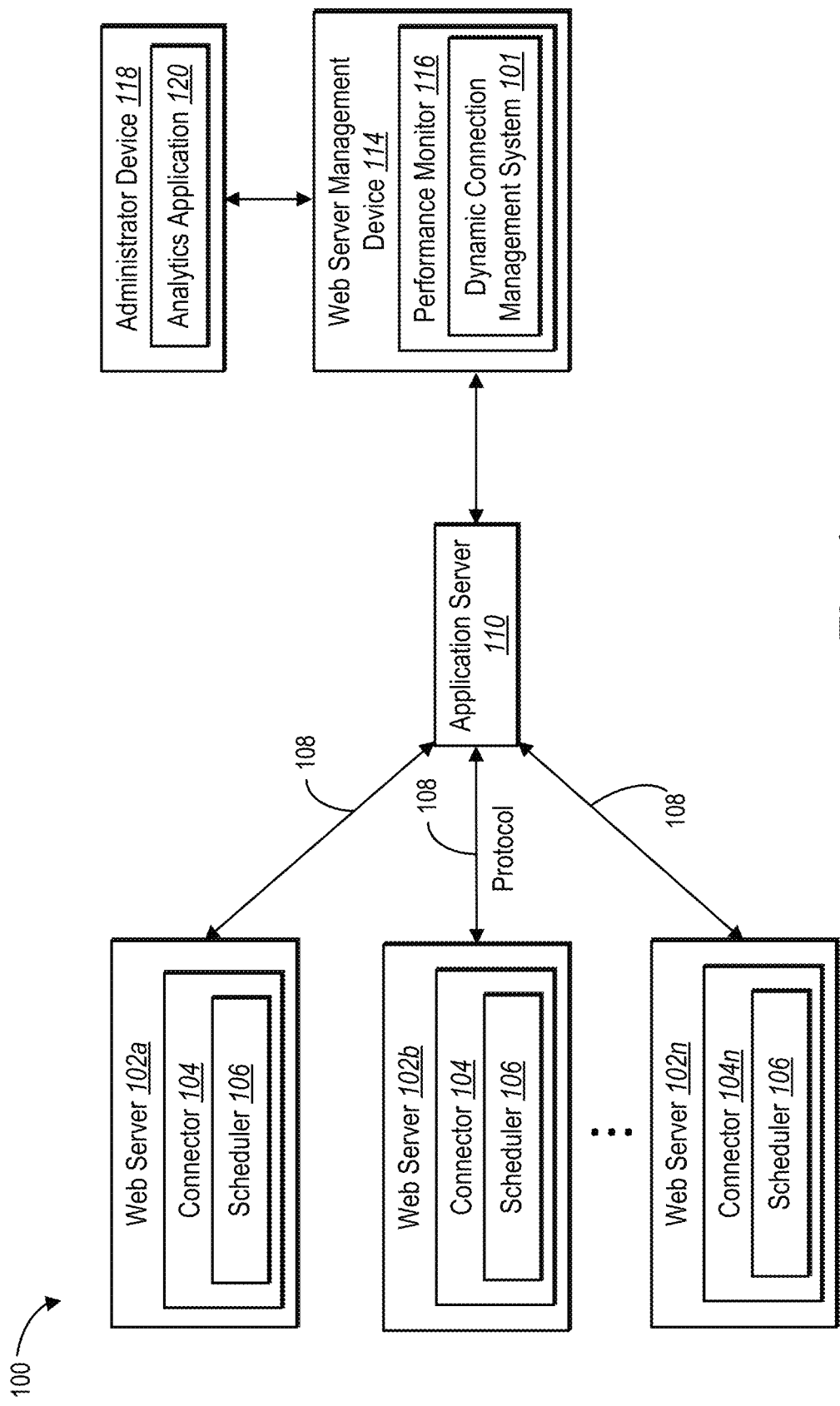
FIG. 1 illustrates a diagram of an exemplary environment in which a dynamic connection management system can operate in accordance with one or more embodiments.

This disclosure describes one or more embodiments of a dynamic connection management system that can dynamically and automatically tune the number of connections allocated to web servers. More specifically, the dynamic connection management system can collect and utilize connection data from web servers and automatically tune the connection pool size for the web servers to handle spikes in connection requests. Thus, the dynamic connection management system can utilize analytics signals from the web servers to efficiently and accurately modify the connection size pool for each web server to meet connection demands.

More specifically, the dynamic connection management system can identify the number of connections currently allocated to a web server. The dynamic connection management system can also detect a number of the allocated connections currently being utilized. Additionally, the dynamic connection management system can predict a number of connections needed over a time period based on historical trends. Then, upon determining that the predicted number of connections exceeds a threshold relative to the number of allocated connections, the dynamic connection management system can dynamically increase the number of allocated connections. The dynamic connection management system can automatically and dynamically increase the number of allocated connections without restarting the web server, taking the web server offline, or interrupting any ongoing connections to the web server.

As discussed briefly above, the dynamic connection management system can monitor the connections to web servers. For example, the dynamic connection management system can monitor current connections and connection requests for the web server at regular intervals (e.g., every 1-30 seconds). In one or more embodiments, the dynamic connection management system can identify the number of connections occurring during each regular interval to determine whether the allocated number of connections will be sufficient.

The dynamic connection management system can predict the number of connections needed at a web server over a future time period and can automatically adjust the number of available or allocated connections based on that prediction. More specifically, the dynamic connection management system can determine a predicted number of needed connections based on the number of current connections for the web server, the health of the web server, and historical request trends. The dynamic connection management system can adjust the number of available or allocated connections to ensure that there will be enough allocated connections for the predicted number of connections.

Further, as mentioned above, the dynamic connection management system can dynamically adjust the number of available connections without requiring a restart of the web server. In particular, the dynamic connection management system can modify the number of available connections by modifying the number of allocated connections in a non-persistent memory of a web server. In other words, the dynamic connection management system can modify the number of allocated connections without modifying the persistent memory of the web server (i.e., the configuration file). Thus, the dynamic connection management system can modify the number of allocated connections without requiring a restart of the web server.

Additionally, the dynamic connection management system can dynamically adjust a number of allocated connections to a web server without interrupting current connections. For example, the dynamic connection management system can create a new connection pool with an updated number of available connections. The dynamic connection management system can copy any ongoing connections with the web server to connections in the new connection pool and initialize any new unused connections. Accordingly, the dynamic connection management system can adjust the number of available connections for web servers without interruption to existing connections.

The dynamic connection management system can provide many advantages and benefits over conventional systems and methods. In particular, although conventional online resource management systems have progressed in recent years, they still have several significant shortcomings with regard to accuracy, efficiency and flexibility. For example, though some conventional systems can allot a number of allocated connections for a web server, this allotment requires guesswork and is subject to human error. These systems lack accuracy in determining an optimal number of connections to allot, particularly for web servers that experience fluctuation in demand. Further, these inaccuracies lead to significant problems with the systems. If allotment is too low, potential users will not be able to connect to the online resource. If allotment is too high, the system wastes valuable system resources (e.g., system memory) on unutilized connections. Further, due to fluctuations in demand for online resources, many web servers experience both problems.

Additionally, though some conventional systems can modify the allocation of allocated connections for a web server, these conventional systems require taking the web server offline and manually modifying the configuration file in order to do so. This down time reduces the efficiency of the system by not allowing users to connect to the online resource during the modification process. Further, such an arduous process for modifying the allocation of allocated connections for the online resource reduces the flexibility of the system because the cost for changes to the configuration file is so high.

In contrast, by monitoring the current number of connections and the health of web servers, the dynamic connection management system can improve accuracy relative to conventional systems. Specifically, by continuously (e.g., over intervals) determining how many available connections to allocate to a web server, the dynamic connection management system more can accurately predict the needs of the web server, thereby, avoiding downtown and efficiently using computing resources.

More specifically, the dynamic connection management system can improve efficiency by modifying the number of connections in the memory of a web server rather than modifying a configuration file. As alluded to above, this allows the dynamic connection management system to modify the number of allocated connections without restarting the web server. That is, the dynamic connection management system can dynamically modify the number of available connections for a web server without taking the web server offline and without interrupting any ongoing connections. By enabling this seamless transition, the dynamic connection management system can allow web servers to remain available online without interruption during modification of the size of a connection pool. This increases efficiency by eliminating downtime for the web server.

Additionally, the dynamic connection management system provides increased flexibility by allowing the number of connections for a web resource to be modified with reduced or eliminated negative consequences for the system. This flexibility to modify the number of allocated connections at any time, allows the system to avoid allocating excess resources to a web server at low demand times. Further, by continuously monitoring the web server, the dynamic connection management system can quickly adjust to unexpected spikes in demand without any connection requests resulting in error.

As illustrated by the foregoing discussion, the present disclosure utilizes a variety of terms to describe features and advantages of the dynamic connection management system. Additional detail is now provided regarding the meaning of such terms. For example, as used herein, the term "allocated connection" refers to a connection available to a web server. In particular, the term "allocated connection" can include memory allocated to receive a connection to a web server from another computing device.

Additionally, as used herein, the term "ongoing connection" refers to an ongoing connection to a web server. In particular, the term "ongoing connection" can include memory allocated to a currently utilized connection with a web server. To illustrate, an ongoing connection can include an ongoing connection between a web server and a client device via a web server and/or an application server.

Further, as used herein, the term "predicted number of connections" refers to an anticipated number of connections needed over a future time period. In particular, the term "predicted number of connections" can include a number of connections determined to likely be requested at a future time based on load data, historical load data, and trends of that data.

Also, as used herein, the term "updated number of connections" refers to a number of connections in a new connection pool for a web server. In particular, the term "updated number of connections" can include a number of connections determined based on a predicted number of connections and/or one or more system settings.

Additionally, as used herein, the term "new connections" refers to allocated connections that have recently been initialized, regardless of whether an ongoing connection has been assigned to the new connection. In particular, the term "new connections" can include any connection in a recently updated connection pool, or any new connection that has been recently initialized. As used herein, the term "new unused connections" refers to allocated connections that have recently been initialized, but that do not have an ongoing connection assigned.

Further, as used herein, the term "web server" refers to hardware and/or software that hosts a web-based resource, which the web server makes available to client devices over the Internet. In particular, a "web server" can provide access to a web site, an online database, a web-based application, or web-based resource.

Also, as used herein, the term "application server" refers computing devices and/or software dedicated to hosting one or more applications. In particular, the term "application server" can include computing devices and/or software dedicated to hosting a service or application for an end user.

Additionally, as used herein, the term "time period" refers to an increment of time. In particular, the term "time period" can include a measurable increment of time over which or after which an event takes place. To illustrate, a time period can include a regular interval at which a system sends and/or provides data or a future time period over which a system makes a prediction.

Further, as used herein, the term "persistent memory" refers to software or hardware for storing data structures such that can be accessed after the end of the process that created or last modified them. As used herein, the term "non-persistent memory" refers to software or hardware for storing data structures such that cannot be accessed after the end of the process that created or last modified them.

Additionally, as used herein, the term "historical load data" refers to historical connection data for a web server. To illustrate, a historical load data can include historical numbers of connections to a resource, historical rates of new connections to a resource, the historical health of a resource, historical percentages of the available connections at the resource that were in use, or other historical connection data.

Also, as used herein, the term "user settings" refers to user-determined parameters that affect system functioning. In particular, the term "user settings" can include user-determined preferences dictating the function of features. To illustrate, a user setting can include preferences for time intervals to be utilized by a system, preferences for inclusions within a graphical user interface, threshold values, or other preferences determined by one or more users.

Additional detail will now be provided regarding the dynamic connection management system in relation to illustrative figures portraying exemplary embodiments. In particular, FIG. 1 illustrates an exemplary environment 100 in which a dynamic connection management system 101 can operate. In particular, FIG. 1 illustrates an exemplary environment 100 that includes web servers 102a, 102b, 102n. In the embodiment shown in FIG. 1, each of the web servers 102a-102n includes a respective connector 104 and scheduler 106. The web servers 102a-102n can communicate, via a protocol 108 with an application server 110. The application server 110 can also communicate with a web server management device 114, which hosts a performance monitor 116. The dynamic connection management system 101 can also be hosted, at least in part, by the web server management device 114. Accordingly, the web servers 102a-102n can communicate with the web server management device 114 through the application server 110.

Although FIG. 1 illustrates a plurality of web servers 102a-102n, it will be appreciated that the environment 100 can include any number of servers. That is, the dynamic connection management system 101 can be implemented with any number of web servers, application servers, and web server management devices. For example, the environment can include a single web server. In any event, the dynamic connection management system 101 can allocate available connections to a variety of web servers in a clustered environment and can do so via any number of application servers and web server management devices.

The web servers 102a-102n can include various types of computing devices and/or software dedicated to hosting one or more web servers. That is, the web servers 102a-102n can host a web server that can receive and/or maintain connections. For example, the web servers 102a-102n can host an online database, website(s), or any other web server. The web servers 102a-102n can include a connector 104, which can allow the web servers 102a-102n to receive and fulfil connection requests with a variety of client devices. The connector 104 can also facilitate communication between the web servers 102a-102n and the application server 110. In one or more embodiments, the connector 104 facilitates connections for various web servers at once.

Additionally, the web servers 102a-102n can include a scheduler 106, which can collect load data for the web server(s). More specifically, the scheduler 106 can monitor the service load for the web server(s) 102a-102n. In one or more embodiments, the scheduler 106 can be part of the connector 104. The scheduler 106 can monitor the number of ongoing connections at a web server and the health of a web server. Then, the web servers 102a-102n can communicate that data to the web server management device 114 via the protocol 108. More specifically, the protocol 108 can facilitate communications between the web servers 102a-102n and the application server 110.

As discussed briefly above, in one or more embodiments, the dynamic connection management system 101 may operate with multiple web servers and application servers in a clustered environment. However, regardless of the configuration, the protocol 108 can allow communication with the web servers 102a-102n via the application server 110. For example, a single web server can communicate with multiple application servers, and a single application server can communicate with multiple web servers. Accordingly, the dynamic connection management system 101 can balance the connection load across a plurality of web servers and application servers.

Further, the dynamic connection management system 101 can dynamically adjust the number of connections available at a given web server 102a-102n without adjusting the number of connections available at other web-servers. Alternatively, the dynamic connection management system 101 can dynamically adjust the number of connections available to various web-servers at once. The dynamic connection management system 101 can balance the load between various web servers and can evaluate load data and historical data from one web server to determine the number of connections to allocate to another web server in the dynamic connection management system 101.

As shown by FIG. 1, the environment 100 can also include an application server 110. The application server 110 can include various types of computing devices and/or software dedicated to hosting one or more applications. The application server 110 may facilitate various connections between the web servers 102a-102n and various client devices. Further, the web servers 102a-102n may communicate with the web server management device 114 through the application server 110.

Further, the dynamic connection management system 101 can include a web server management device 114. The web server management device 114 can be any of various types of computing devices, as described in greater detail below with regard to FIG. 8. Additionally, the web server management device 114 can include or host the performance monitor 116 and the dynamic connection management system

101. The dynamic connection management system 101 can, based on the data received from the web servers 102a-102n, determine a number of connections to make available for a web server. While FIG. 1 shows the application server 110 and the web server management device 114 as separate devices, in one or more embodiments they can be the same device or hosted together across the same plurality of devices.

As suggested by previous embodiments, the dynamic connection management system 101 can be implemented in whole or in part by the individual elements of the environment 100. Although FIG. 1 illustrates the dynamic connection management system 101 implemented within the web server management device 114, components of the dynamic connection management system 101 can be implemented in any of the components of the environment 100. This disclosure describes the components of the dynamic connection management system 101 further below with regard to FIG. 5. For example, in one or more embodiments, the connection 104 and scheduler 106, in whole or in part, form part of the dynamic connection management system 101.

As further shown in FIG. 1, in some embodiments, the administrator device 118 comprises a computing device that enables an administrator to send and receive digital communications. For example, the administrator device 118 can include a desktop computer, laptop computer, smartphone, tablet, or other electronic device. In some embodiments, the administrator device 118 further includes one or more software applications (e.g., an analytics application) that enables the administrator to send and receive digital communications. For example, the analytics application 120 can be a software application installed on the administrator device 118 or a software application hosted on the web server management device 114. When hosted on the web server management device 114, the analytics application 120 may be accessed by the administrator device 118 through another application, such as a web browser.

In some implementations, the analytics application 120 includes instructions that, when executed by a processor, cause the administrator device 118 to present one or more graphical user interfaces, such as various user interfaces described below. For example, in certain embodiments, the analytics application 120 includes instructions that, when executed by a processor, cause the administrator device 118 to present graphical user interfaces comprising options to select one or more options for controlling the connections of the web servers 102a-102n or providing information about the connections or health of the web servers 102a-102n.

Figure 2:
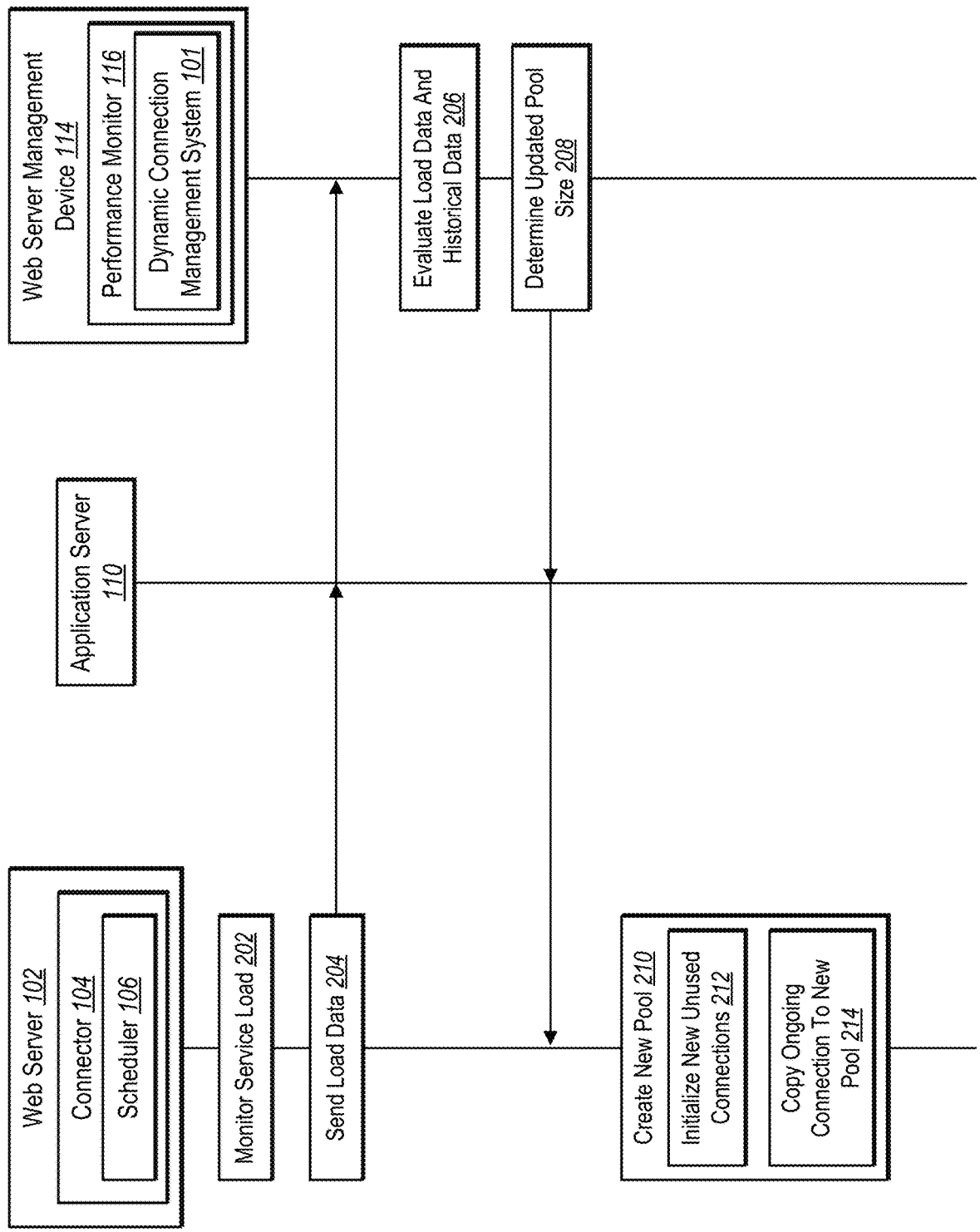
FIG. 2 illustrates a sequence diagram of acts in a process of dynamically altering the number of available connections for a web server in accordance with one or more embodiments.

As discussed above, the dynamic connection management system 101 can modify the number of allocated connections for a web server quickly and efficiently with no interruption to the web server. In particular, FIG. 2 shows a sequence diagram showing an embodiment of a process of dynamically altering the number of available connections for a web server. As illustrated in FIG. 2, a web server 102 (e.g., one of web servers 102a-102n) can perform act 202 of monitoring the service load. More specifically, the web server 102 can, via the scheduler 106, monitor a web server for "load data" including the current number of ongoing connections, the rate of new connections, the current health of the web server, and the percentage of the available connections of the web server 102 that are currently in use. More specifically, the web server 102 can detect a site name for the site to which the data belongs (e.g., a web site or application hosted by the web server 102), data regarding the port at which the site is operational, and the name of the web server for the site. The web server 102 can also monitor the current number of ongoing connections in use for the site, the array of each instance on the site, the current site health, the current number of available connections, data regarding the load balance, and a time stamp for the data.

For example, the web server 102 can monitor a number of ongoing connections and/or requested new connections for the web server 102 repeatedly at a monitoring time interval. For example, the web server 102, and more particularly the scheduler 106, can determine the number of ongoing connections for the web server every second, every two second, every five seconds, or at another time interval.

Further, as illustrated by FIG. 2, while monitoring the service load of the web server 102, the web server 102 can also perform the act 204 of sending load data to the web server management device 114 via the application server 110. As described above, the web server 102 can communicate load data to the web server management device 114 and the performance monitor 116 via the connector 104 and protocol 108 by transmitting the load data to the application server 110.

More specifically, the web server 102 can send the load data at reporting time interval (e.g., every 30 seconds, every minute, or every 90 seconds). The dynamic connection management system 101 can automatically set the monitoring and reporting time intervals, or the monitoring and reporting time intervals can be determined according to user settings. The reporting time interval can be longer than the monitoring time interval. For example, the web server 102 can monitor (e.g., determine the currently utilized connections) every second and can send the load data to the application server 110 every minute.

In one or more embodiments, the web server 102 can determine a high or average number of ongoing connections during the reporting time interval from the determined number of ongoing connections determined at the monitoring time interval. For example, the web server 102 can determine the number of ongoing connections every second (e.g., at the monitoring time interval). Then for a given reporting time interval, the web server 102 can determine the highest monitored number of ongoing connections. Alternatively, the web server 102 can average all of the monitored number of ongoing connections during the reporting time interval. Thus, when the monitoring time interval is one second and the reporting time interval is one minute, the web server 102 can average 60 instances of the number of ongoing connections for the web server 102 or identify the highest instance of ongoing connections from the 60 instances of ongoing connections.

In one or more embodiments, at the end of a reporting time interval, the web server 102 sends the maximum or average number of concurrent requests that occurred during the reporting time interval to the application server 110 for use in determining a predicted number of connections.

Further, the dynamic connection management system 101 can instruct the web server 102 to override the normal reporting time interval in the case of a spike in connections. More specifically, if the scheduler 106 detects that the number of connections meets or exceeds a certain threshold percentage of available connections, the web server 102 can send the load data immediately rather than sending at the end of the regular reporting time interval. The dynamic connection management system 101 can automatically set the percentage threshold, or it can be determined by user settings. For example, a web server 102 could have a regular reporting time interval of 90 seconds and a percentage threshold of 90%. With these settings, if the scheduler 106 detects that 90% of the available connections were in use 4 seconds into the regular reporting time interval, the web server 102 can immediately (or within a shortened time frame) send the load data to the dynamic connection management system 101 via the application server 110.

In another example, a web server 102 can have a regular reporting time interval of 1 minute and a percentage threshold of 95%. With these settings, if the scheduler 106 detects that 95% of the available connections are in use at any point before the completion of the regular interval, the web server 102 can send the load data to the dynamic connection management system 101 upon detecting the 95% load rather than upon detecting the end of the regular reporting time interval.

Further, the web server 102 can send the load data in response to detecting that various site data meets a threshold value or undergoes a sudden change. For example, the web server 102 can detect changes or values for the site health, site instances, or load balance. For example, the web server 102 can, in response to detecting that a site is at 25% site health, send load data to the dynamic connection management system 101 without regard to the regular reporting time interval. In another example, the web server 102 can send the load data to the dynamic connection management system 101 without regard to the regular reporting time interval in response to detecting a 30% change to the load balance at the web server 102.

Additionally, as illustrated by FIG. 2, the dynamic connection management system 101 can perform act 206 of evaluating load data and historical data. In one or more embodiments, the dynamic connection management system 101 may store historical data for various web servers at the application server 110 and/or at the web server management device 114. Historical data may be archived load data for the web server 102, including historical numbers of connections to the web server 102, historical rates of new connections to the web server 102, the historical health of the web server 102, and the historical percentages of the available connections at the web server 102 that are currently in use. The dynamic connection management system 101 can track these historical metrics for various dates, times, days of the week, holidays, seasons, etc. The dynamic connection management system 101 can, at the web server management device 114, recognize trends from the historical data and the load data from the web servers 102a-102n.

As illustrated by FIG. 2, the dynamic connection management system 101 can perform act 208 of determining an updated pool size. Based on system settings, the identified trends, historical data, and current load data, the dynamic connection management system 101 can determine an updated pool size (i.e., a number of connections) to allocate to the web server 102. In one or more embodiments, the dynamic connection management system 101 can determine a predicted number of connections over a future time period and utilize a threshold number of connections or threshold percentage of available connections to determine an updated pool size. That is, the dynamic connection management system 101 can determine a predicted number of connections over a future time period based on load data and historical data and can then determine an updated pool size based on the predicted number of connections. In one or more embodiments, the dynamic connection management system 101 can determine an updated pool size based on a "buffer" of a percentage threshold or threshold number of connections over the predicted number of connections. The dynamic connection management system 101 can automatically implement these thresholds, or they may be determined via user settings. Then, the dynamic connection management system 100 can send the updated pool size to the web server 102, including sending the name of the site and/or server to increase and the increase ratio or updated pool size as a number of connections.

Upon receiving the updated pool size, the web server 102 can perform the act 210 of creating a new connection pool. More specifically, the dynamic connection management system 101 can update the number of available connections for a web server 102 by modifying the non-persistent memory of the resource. That is, the dynamic connection management system 101 may not modify the configuration file for the web server 102, and instead changes the value for the number of available connections in the non-persistent memory of the web server 102.

More specifically, the web server 102 can perform act 212 of initializing new unused connections. The dynamic connection management system 101 can cause the web server 102 to initialize the full new connection pool with each new connection empty. Then, the web server 102 can perform act 214 of copying ongoing connections to connections in the new connection pool. That is, the web server 102 can point copy each of the ongoing connections to the new connection pool. Then, the system can de-allocate the memory previously dedicated to the ongoing connections to reduce or eliminate redundancies and free up computing resources.

Figure 3A:
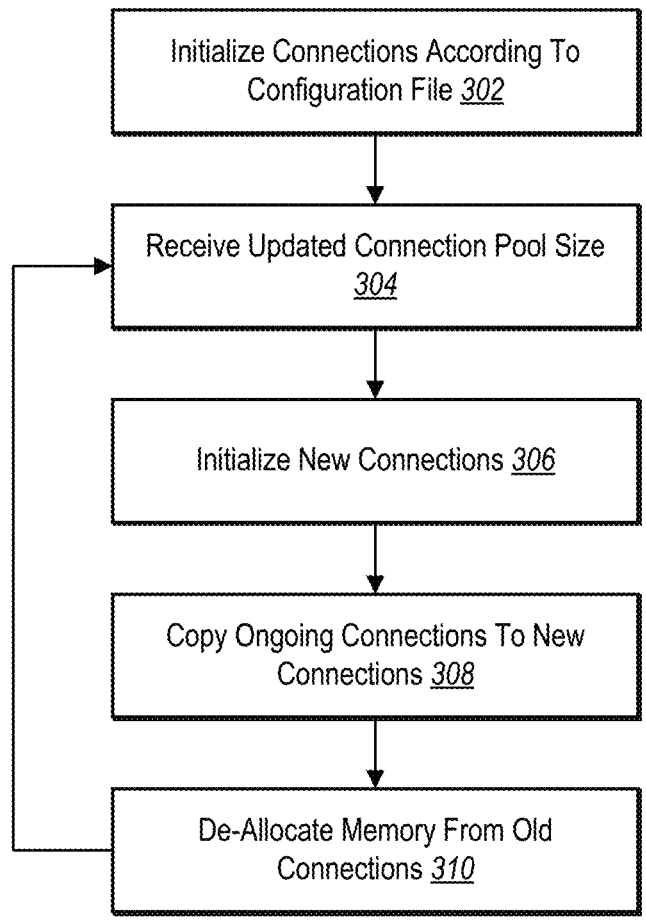
FIG. 3A illustrates a flowchart for a process of dynamically adjusting a connection pool size by a dynamic connection management system in accordance with one or more embodiments.
Figure 3B:
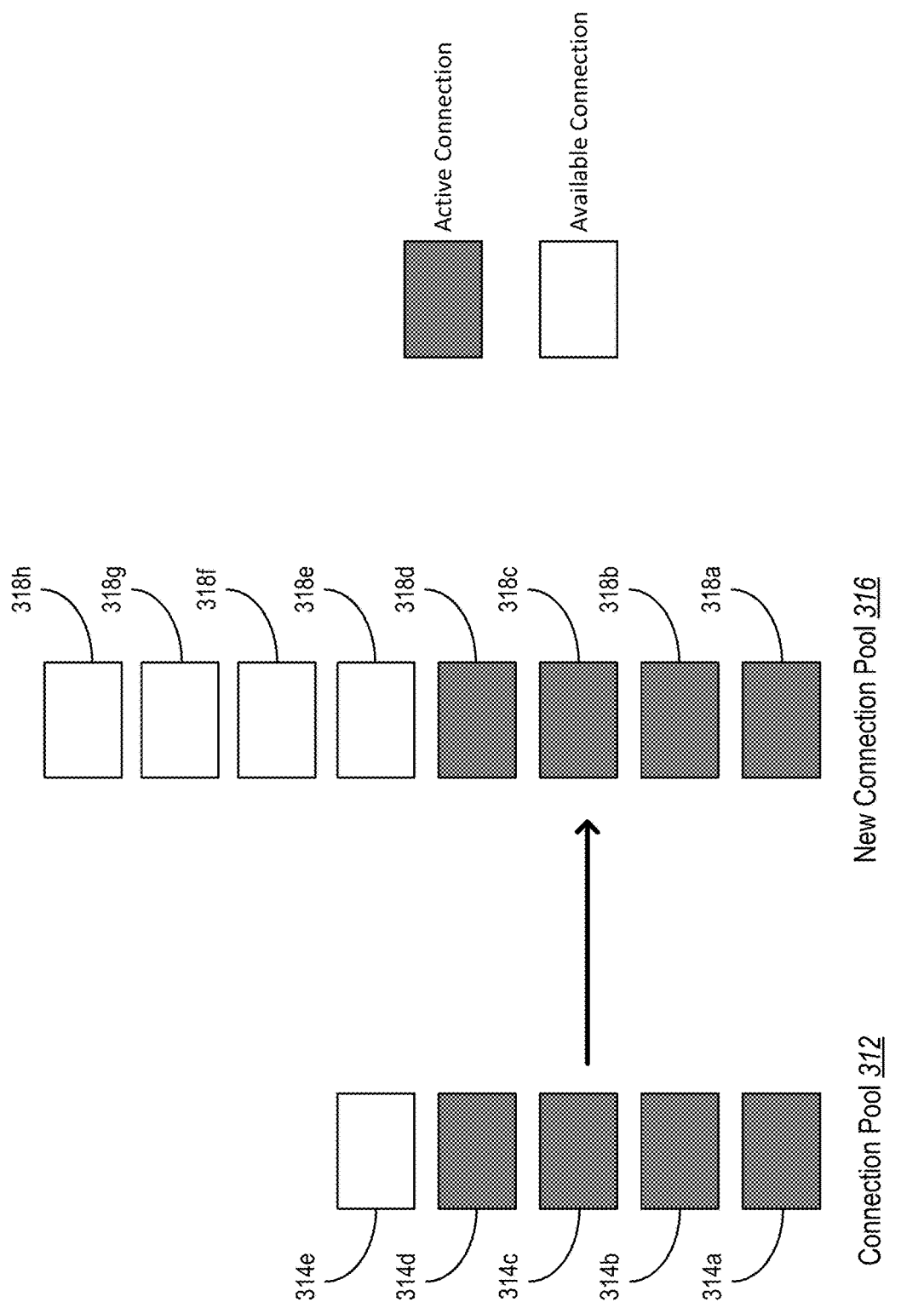
FIG. 3B illustrates schematic diagram of dynamically adjusting a connection pool size by a dynamic connection management system in accordance with one or more embodiments.

FIGS. 3A and 3B provide additional detail for an embodiment of a process of dynamically adjusting a connection pool size. FIG. 3A illustrates series of acts 300, which may be performed at the web server 102. The acts 300 can be performed by a component of the dynamic connection management system 101 on the web server 102 or performed by the web server 102 in response to instructions sent to the web server 102 from the dynamic connection management system 101.

For example, as illustrated by FIG. 3A, the web server 102 can perform the act 302 of initializing connections according to a configuration file stored on the web server 102. That is, the dynamic connection management system 101 can initialize the web server 102 and allocate the number of connections specified in the configuration file. More specifically, the web server 102 can read the number of connections indicated in the configuration file stored in persistent memory on the web server 102 to non-persistent memory. In response to which, the web server 102 can initialize a connection pool 312, as shown by FIG. 3B, having the number of connections specified in the configuration file. The example shown by FIG. 3B, illustrates a connection pool 312 with five connections 314a-314e.

Additionally, as shown in FIG. 3A, the web server 102 can perform act 304 of receiving an updated connection pool size. As discussed above, the web server 102 can receive a new connection pool size from the dynamic connection management system 101 through the application server 110, including via the protocol 108. In particular, as described above, the dynamic connection management system 101 can determine a need to increase the number of connections at the web server 102 beyond the number of connections in the connection pool 312. In particular, as described above, the scheduler 106 can send analytics data indicating that connections 314a, 314b, 314c, and 314d are active. In response to the number of active connections and historical data, the dynamic connection management system 101 can determine to increase the number of connections at the web server 102 to avoid receive more requests than available connections. For example, the dynamic connection management system 101 can determine to increase the number of connections from five to eight. In particular, the dynamic connection management system 101 can send a trigger to the connector 104 at the web server 102 via the application server 110 to increase the number of connections.

Upon receipt of the updated connection pool size and trigger received form the dynamic connection management system 101, as shown in FIG. 3A, the web server 102 can perform act 306 of initializing new connections. In one or more embodiments, the web server 102 modifies the number of available connections for the web server 102 by modifying the indicated number of connections in the non-persistent memory of the web server 102. More specifically, the web server 102 can allocate available memory to each connection 318a-318h in a new connection pool 316, as shown by FIG. 3B. That is the web server 102 can initialize the new connection pool 316 to have the updated connection pool size (e.g., 8 in the example embodiment shown in FIG. 3B).

Then, as shown in FIG. 3A, the web server 102 can perform act 308 of copying ongoing connections 314a, 314b, 314c, 314d to new connections 318a, 318b, 318c, 318d in the new connection pool 316. More specifically, the web server 102 can cause each of the ongoing connections 314a, 314b, 314c, 314d to point to a new connection 318a, 318b, 318c, 318d in the new connection pool 316. Then, the web server 102 can copy each of the ongoing connections 314a, 314b, 314c, 314d from the "old" connection pool 312 to a connection 318a, 318b, 318c, 318d in the new or updated connection pool 316, as shown by FIG. 3B. The web server 102 can copy the ongoing connections 314a, 314b, 314c, 314d to the new connection pool 316 without interrupting the ongoing connections 314a, 314b, 314c, 314d. In other words, from the perspective of a client device accessing a web resource at the web server 102 via an ongoing connection, the transition of the ongoing connection from the connection pool 312 to the new connection pool 316 is seamless or undetectable.

As shown in FIG. 3A, the web server 102 can also perform act 310 of de-allocating memory from the old connections 314a-314e. To reduce or eliminate redundancies, the web server 102 can then de-allocate the memory dedicated to ongoing connections 314a, 314b, 314c, 314d from the "old" connection pool 312. The web server 102 can de-allocate this memory after the ongoing connections have each been point copied to the new connection pool 316. Consequently, the web server 102 can modify the number of available connections without any interruption to the ongoing connections to the web server 102.

Figure 4:
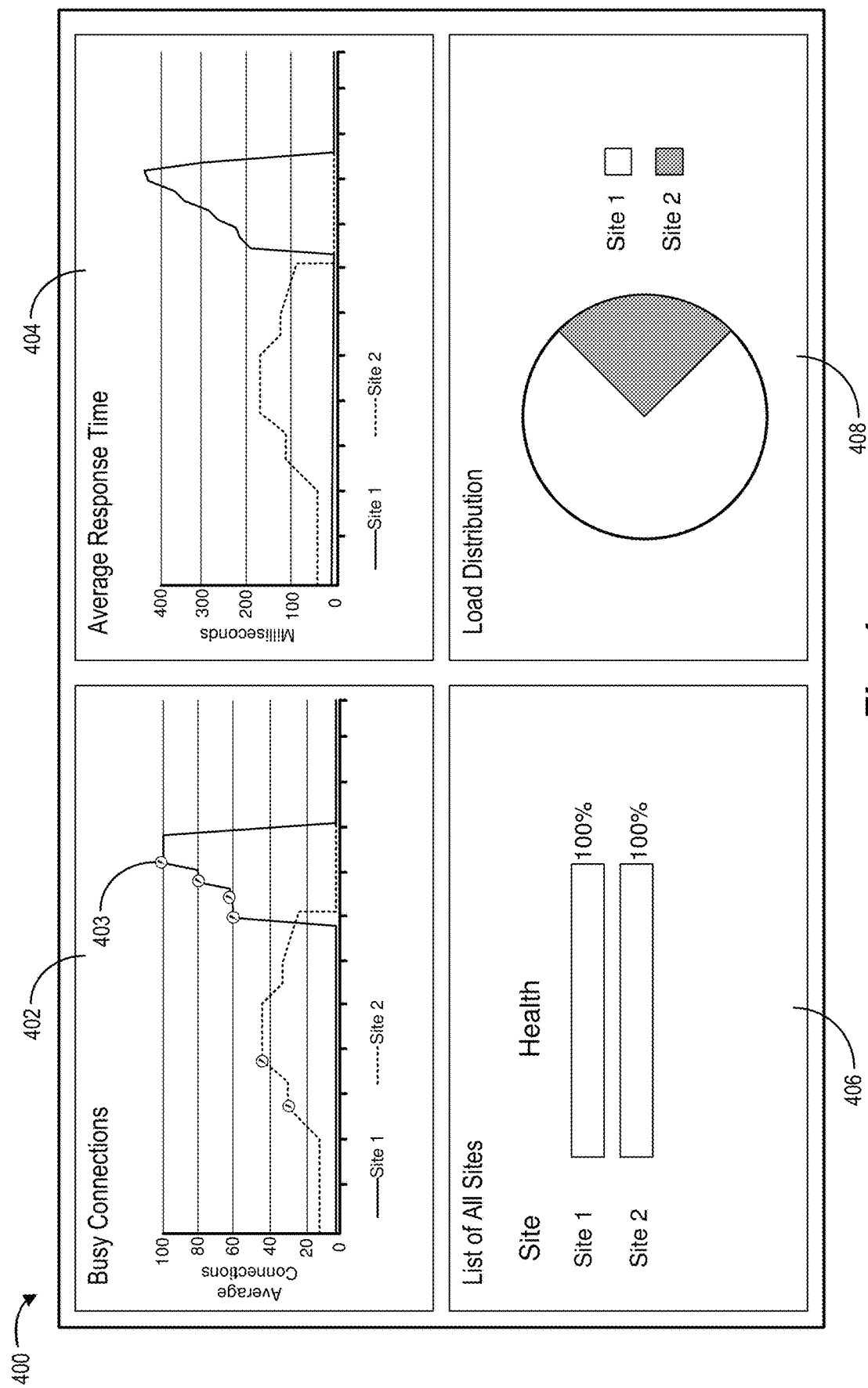
FIG. 4 illustrates an example graphical user interface for interacting with a dynamic connection management system in accordance with one or more embodiments.

As mentioned above, the analytics application 120 on the administrator device 118 can present graphical user interfaces comprising options to select one or more options for controlling the connections of the web servers 102a-102n or providing information about the connections or health of the web servers 102a-102n. FIG. 4 shows an example embodiment of a graphical user interface for the dynamic connection management system 101. More specifically, the graphical user interface 400 includes various interactable data displays for web servers of the dynamic connection management system 101. The graphical user interface 400 includes interactable data displays for two example web servers, Site 1 and Site 2. Though FIG. 4 shows the graphical user interface 400 including four charts and graphs, it will be appreciated that the graphical user interface 400 can include any of a variety of charts and/or graphs that visualize load data and/or historical data from the dynamic connection management system 101.

More specifically, the graphical user interface 400 can include the busy connections graph 402. FIG. 4 shows busy connections graph 402 including historical trends for the average number of connections over time. It will be appreciated that while FIG. 4 shows the graph as a line graph differentiated by solid and dashed lines, the busy connections graph 402 could be presented in accordance with a variety of designs, including various colors and/or patterns. The busy connections graph 402 can include any historical connection data from the dynamic connection management system 101. For example, in one or more other embodiments, the busy connections graph 402 could display historical trends for the maximum number of new connections over various time periods, the average number of new connections over various time periods, or any other connection data from the dynamic connection management system 101.

Further, in one or more embodiments, in response to detecting user input (e.g. a mouse hover, tap, click, etc.) at a portion of the busy connections graph 402, the dynamic connection management system 101 can display additional information about the portion of the busy connections graph 402. More specifically, the dynamic connection management system 100 can display the number of active connections and the number of available connections at the selected time for the selected site.

Additionally, the busy connections graph 402 can include the dynamic update icon 403. The busy connections graph 402 can include dynamic update icon 403 at each time at which the dynamic connection management system 101 caused the number of available connections for a web server to dynamically increase. In one or more embodiments, the dynamic connection management system 101 can present additional information upon detecting a selection at a dynamic update icon 403 or at another location on the busy connections graph 402. For example, upon interaction with a dynamic update icon 403, the dynamic connection management system 101 can display the load data that caused the update to the connection pool.

Additionally, the graphical user interface 400 can include the average response time graph 404. FIG. 4 shows the average response time graph 404 including historical trends for the average response of the web servers over time. Similar to the discussion above with regard to the busy connections graph 402, it will be appreciated that the average response time graph 404 can be presented in accordance with a variety of designs. Further, in response to receiving interaction at the average response time graph 404, the dynamic connection management system 101 can present additional information to the user regarding the response time of various web servers.

Further, the graphical user interface 400 can include the web server health chart 406. FIG. 4 illustrates the web server health chart 406 visualizing the current health of Site 1 and Site 2 via health "bars." It will be appreciated that the web server health chart could visualize the health of any number web servers from the dynamic connection management system 101 in a variety of ways. Further, in one or more embodiments, the web server health chart 406 can visualize the health of the web servers over time rather than the current health. Additionally, in response to detecting user interaction at the web server health chart, the dynamic connection management system 101 can present additional data regarding the health of various web servers.

The graphical user interface 400 can also include the load distribution chart 408. FIG. 4 illustrates the load distribution chart 408 as a pie chart showing the current distribution of connections across Site 1 and Site 2. The load distribution chart 408 can visualize the distribution of current connections of various web servers in a variety of ways. For example, the load distribution chart 408 could show the distribution via a line graph, a bar graph, or any other chart or graph. Further, the load distribution chart 408 can be presented according to a variety of designs and can present additional data regarding the load distribution for the dynamic connection management system 101 upon receiving user interaction at the load distribution chart 408.

Figure 5:
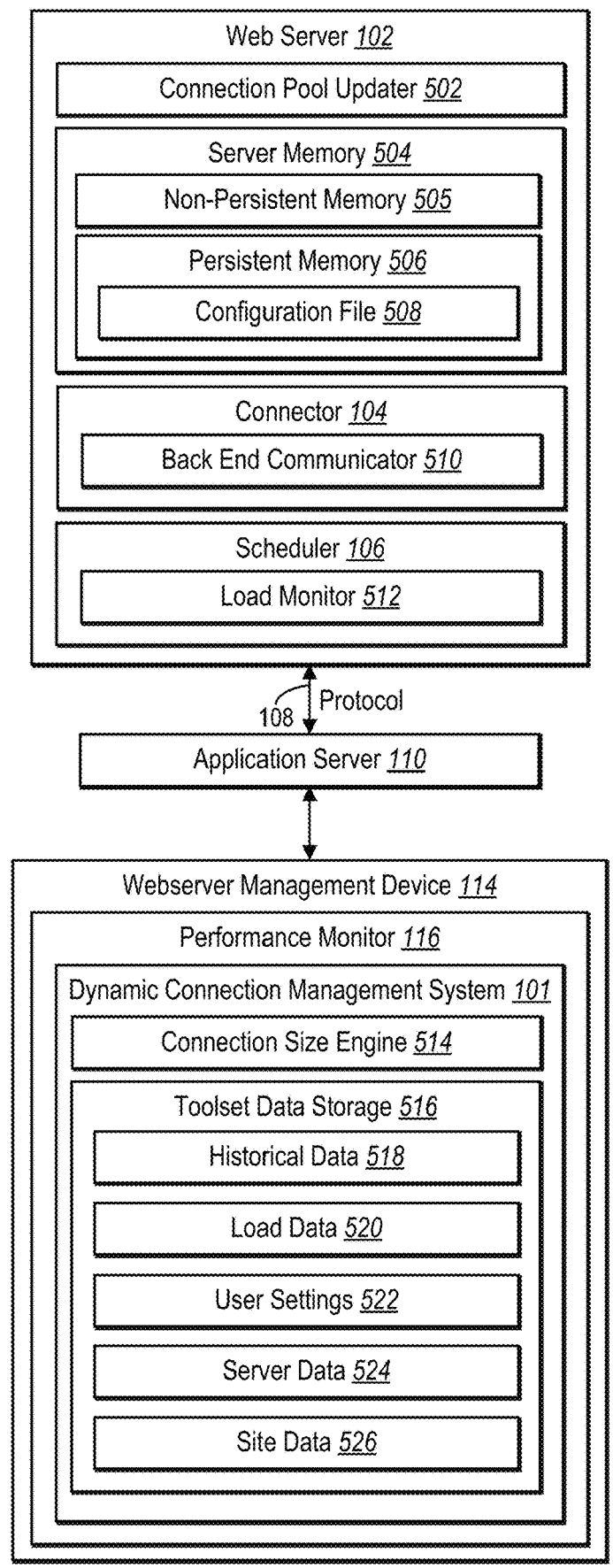
FIG. 5 illustrates an exemplary architecture of a dynamic connection management system in accordance with one or more embodiments.

Turning to FIG. 5, additional detail will be provided regarding capabilities and components of the dynamic connection management system 101 in accordance with one or more embodiments. In particular, FIG. 5 shows a schematic diagram of example architecture of the dynamic connection management system 101 hosted on a web servers 102a-102n, an application server 110, and a web server management device 114. The dynamic connection management system 101 can represent one or more embodiments of the dynamic connection management system 101 described previously.

As illustrated in FIG. 5, the dynamic connection management system 101 includes various components for performing the processes and features described herein. For example, the dynamic connection management system 101 can include a web servers 102a-102n, as described above. Further, the web servers 102a-102n can include the connection pool updater 502.

Additionally, the web servers 102a-102n can include the server memory 504. The server memory 504 can include the non-persistent memory 505 and the persistent memory 506. Further, the persistent memory 506 can include the configuration file 508. As discussed above, the dynamic connection management system 101 can modify the non-persistent memory 505 of a web server in order to dynamically update the number of available connections for that resource.

As discussed above, the web servers 102a-102n can also include the connector 104, which can facilitate communications between the web servers 102a-102n, the application server 110, and the web server management device 114. More specifically, the connector 104 can include the back end communicator 510. The back end communicator can facilitate communications between the web servers 102a-102n, the application server 110, and the web server management device 114.

Further, as discussed above, the web servers 102a-102n can include the scheduler 106. In one or more embodiments, the scheduler 106 is included as part of the connector 104. The scheduler 106 can continuously monitor load data for web servers of the dynamic connection management system 101, such as the current number of connections, the health of the web server, and the percentage of allocated connections currently used. More specifically, the scheduler 106 can include the load monitor 512. The load monitor 512 can monitor the "load data" for a web server, including current number of connections to the resource, the rate of new connections to the resource, the current health of the resource, and the percentage of the available connections at the resource that are currently in use.

Also as discussed above, the dynamic connection management system 101 may include the application server 110. The application server 110 may facilitate connections between client devices and various web servers of the dynamic connection management system 101. The web servers 102a-102n may communicate with the web server management device 114 through the application server 110. Further, in one or more embodiments, the application server 110 can store historical load data.

As shown in FIG. 5, the web server management device 114 may include the performance monitor 116. The performance monitor can evaluate load data and historical load data to predict a number of connections for a future time period and determine an updated connection pool size for a web server. As discussed above in greater detail with regard to FIGS. 2-3, the performance monitor can identify trends from the historical load data and utilize these trends in its predictions and/or determinations.

More specifically, as shown in FIG. 5, the performance monitor 116 can include the connection size engine 514. The connection size engine 514 can continuously determine an updated connection pool size for one or more web servers. As discussed above, this determination can be based on a predicted number of connections over a future time period, current load data, and historical load data. Additionally, as shown in FIG. 5, the performance monitor 116 can include the toolset data storage 516. The toolset data storage 516 can include historical data 518, load data 520, user settings 522, server data 524, and site data 526.

FIG. 5 illustrates a schematic diagram of an example configuration on which the dynamic connection management system 101 could be implemented in accordance with one or more embodiments. Each of the components 102-526 of the dynamic connection management system 101 can include software, hardware, or both. For example, the components 102-526 can include one or more instructions stored on a computer-readable storage medium and executable by processors of one or more computing devices, such as the web servers 102a-102n, application server 110, or web server management device 114. When executed by the one or more processors, the computer-executable instructions of the dynamic connection management system 101 can cause the computing device(s) to perform the methods described herein. Alternatively, the components 102-526 can include hardware, such as a special-purpose processing device to perform a certain function or group of functions. Alternatively, the components 102-526 of the dynamic connection management system 101 can include a combination of computer-executable instructions and hardware.

Furthermore, the components 502-526 of the dynamic connection management system 101 may, for example, be implemented as one or more operating systems, as one or more stand-alone applications, as one or more modules of an application, as one or more plug-ins, as one or more library functions or functions that may be called by other applications, and/or as a cloud-computing model. To illustrate, the components 502-526 may be implemented in an application, including but not limited to ADOBE® COLDFUSION®, ADOBE® COLDFUSION® BUILDER™, ADOBE® CONTENT SERVER, ADOBE® MEDIA SERVER, ADOBE® FRAMEMAKER® PUBLISHING SERVER, and/or ADOBE® INDESIGN® SERVER.

Figure 6:
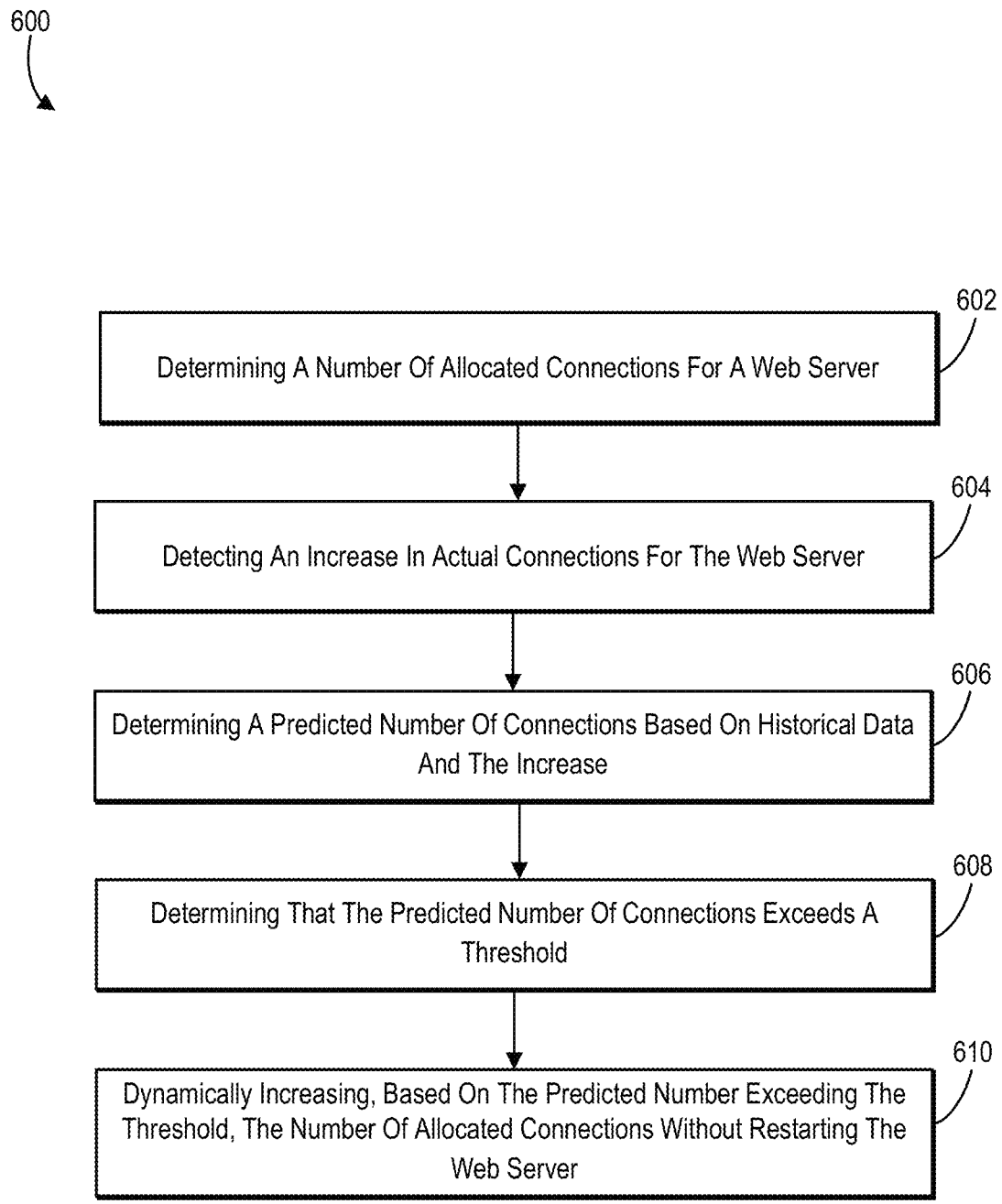
FIG. 6 illustrates a flowchart of a series of acts of dynamically adjusting a connection pool size in accordance with one or more embodiments.
Figure 7:
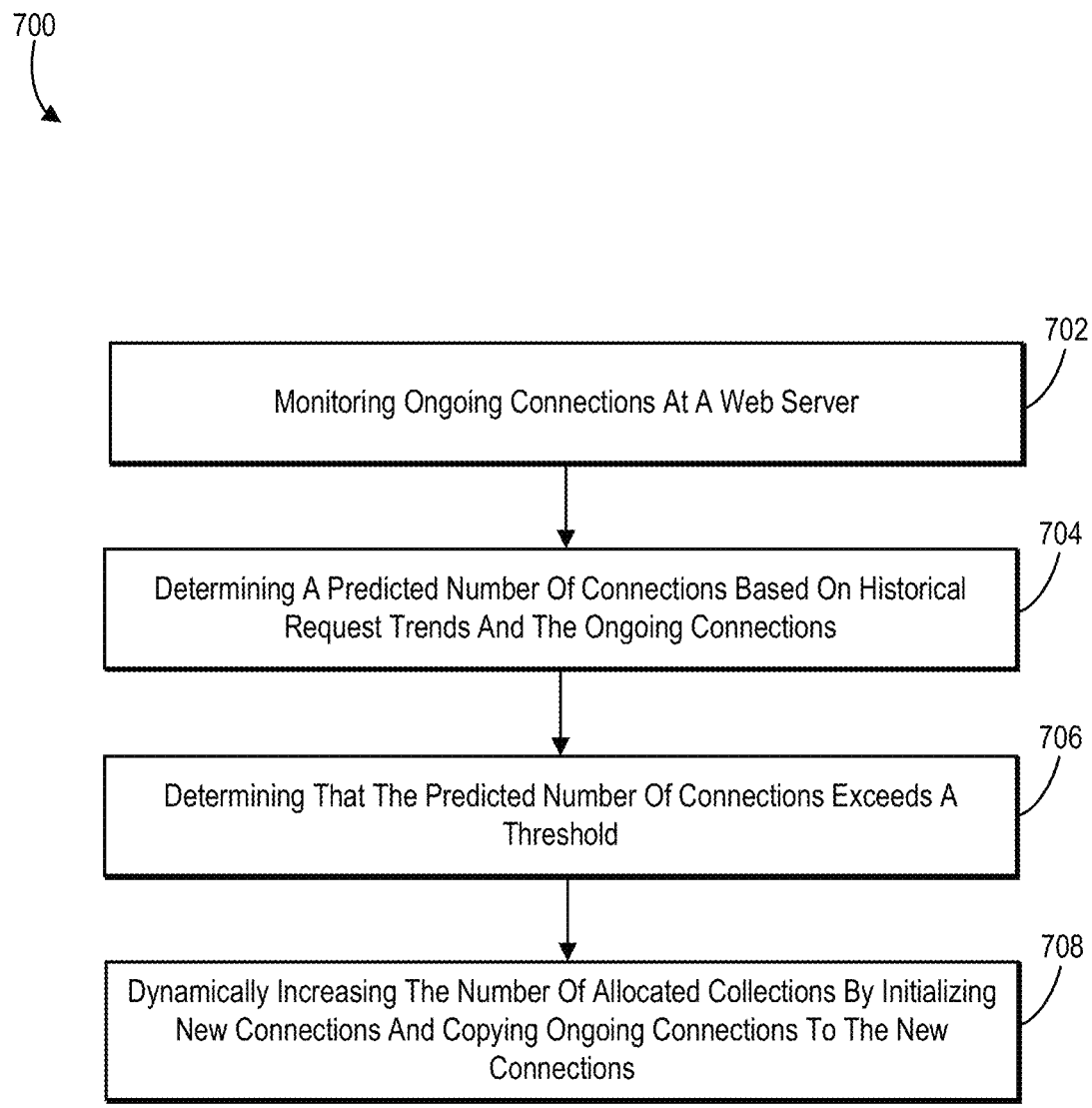
FIG. 7 illustrates a flowchart of a series of acts of dynamically adjusting a connection pool size in accordance with one or more additional embodiments.

FIGS. 1-5, the corresponding text, and the examples provide a number of different methods, systems, devices, and non-transitory computer-readable media of the dynamic connection management system 101. In addition to the foregoing, one or more embodiments can also be described in terms of flowcharts comprising acts for accomplishing a particular result, as shown in FIGS. 6-7. FIGS. 6-7 may be performed with more or fewer acts. Further, the acts may be performed in differing orders. Additionally, the acts described herein may be repeated or performed in parallel with one another or parallel with different instances of the same or similar acts. Further, the series of acts 600, 700 may be performed in a clustered environment comprising two or more web servers and two or more application servers.

As mentioned, FIGS. 6-7 illustrates a flowchart of a series of acts 600, 700 in accordance with one or more embodiments. While FIGS. 6-7 illustrate acts according to one embodiment, alternative embodiments may omit, add to, reorder, and/or modify any of the acts shown in FIGS. 6-7. The acts of FIGS. 6-7 can be performed as part of a method. Alternatively, a non-transitory computer-readable medium can comprise instructions that, when executed by one or more processors, cause a computing device to perform the acts of FIGS. 6-7. In some embodiments, a system can perform the acts of FIGS. 6-7.

As shown in FIG. 6, the series of acts 600 includes an act 602 for determining a number of allocated connections for a web server. Additionally, as shown in FIG. 6, the series of acts 600 includes an act 604 of detecting an increase in ongoing connections for the web server. In particular, the act 604 can include detecting an increase in actual connections for the web server over a first time period. In particular, the act 604 can include identifying an increase in a number of ongoing connections for the web server over a first time period. Further, the act 604 can include identifying the increase in a number of ongoing connections for the web server over a first time period by receiving, from a scheduler at the web server, a number of ongoing connections or requests for connections.

Additionally, as shown in FIG. 6, the series of acts 600 includes an act 606 of determining a predicted number of connections based on historical data and the increase. In particular, the act 606 can include determining, based on historical request trends and the detected increase, a predicted number of connections over a second time period.

Additionally, as shown in FIG. 6, the series of acts 600 includes an act 608 of determining that the predicted number of connections exceeds a threshold. In particular, the act 608 can include determining that the predicted number of connections exceeds a predetermined threshold relative to the number of allocated connections for the web server.

Specifically, the act 608 can include determining, based at least on the number of ongoing connections for the web server and historical load data, an updated number of connections for the web server. Further, the act 608 can include receiving, via a graphical user interface, one or more user settings, and determining, based on the one or more user settings, the predetermined threshold. The act 608 can also be performed wherein the predetermined threshold relative to the number of allocated connections for the web server is a predetermined threshold for a difference between the number of allocated connections and the predicted number of connections over the second time period. The act 608 can also include determining, based at least on the number of ongoing connections for the web server and historical load data, an updated number of connections for the web server Additionally, as shown in FIG. 6, the series of acts 600 includes an act 610 of dynamically increasing, based on the predicted number exceeding the threshold, the number of allocated connections without restarting the web server. In particular, the act 610 can include dynamically increasing, based on the predicted number of connections exceeding the predetermined threshold, the number of allocated connections for the web server without restarting the web server. The act 610 can also include dynamically increasing the number of allocated connections for the web server by sending the updated number of connections to the web server along with a trigger to increase the number of allocated connections for the web server to the updated number of connections. Additionally, the act 610 can include dynamically increasing the number of allocated connections for the web server by dynamically altering a number of allocated connections indicated in non-persistent memory of the web server. Further, the act 610 can include dynamically increasing the number of allocated connections for the web server without altering a number of allocated connections stored in persistent memory of the web server. Specifically, the act 610 can include allocating memory for new connections, copying ongoing connections to the memory for the new connections, de-allocating the memory previously utilized for the ongoing connections, and initializing new unused connections.

As shown in FIG. 7, the series of acts 700 includes an act 702 of monitoring ongoing connections at a web server. In particular, the act 702 can include monitoring, at the at least one web server, a number of ongoing connections for the at least one web server. Additionally, the act 702 can include determining, at the number of ongoing connections repeatedly at a first time interval, determining a high number of ongoing connections during a second time interval from the numbers of ongoing connections determined at the first time interval, the second time interval being longer than the first time interval, and reporting the high number of ongoing connections repeatedly at the second time interval for use in determining the predicted number of connections.

The act 702 can also include determining that a first number of ongoing connections determined at the first time interval is within a predetermined percentage of the number of allocated connections for the at least one web server and reporting the first number of ongoing connections prior to the second time interval for use in determining the predicted number of connections. Further, the act 702 can include sending, by a scheduler at the at least one server, the high number of ongoing connections to the at least one application server. Additionally, the act 702 can include detecting a change in the health of the at least one web server, and wherein the predicted number of connections over the second time period is further based on the change in the health of the at least one web server.

As shown in FIG. 7, the series of acts 700 also includes an act 704 of determining a predicted number of connections based on historical request trends and the ongoing connections. In particular, the act 704 can include determining, based on historical request trends and the monitored number of ongoing connections, a predicted number of connections.

Additionally, as shown in FIG. 7, the series of acts 700 also includes an act 706 of determining that the predicted number of connections exceeds a threshold. In particular, the act 706 can include determining that the predicted number of connections exceeds a predetermined threshold relative to a number of allocated connections for the at least one web server.

Further, as shown in FIG. 7, the series of acts 700 also includes an act 708 of dynamically increasing the number of allocated collections by initializing new connections and copying ongoing connections to the new connections. In particular, the act 708 can include dynamically increasing the number of allocated connections for the at least one web server by initializing a set of new connections and copying the ongoing connections to new connections of the set of new connections. Additionally, the act 708 can include dynamically increasing the number of allocated connections automatically in response to an increase in the number of ongoing connections and without further input or instruction from an administrator. Further, the act 708 can include dynamically increasing the number of allocated connections for the at least one web server without restarting the at least one web server or interrupting the ongoing connections. The act 708 can also include sending, from the at least one application server, an updated number of connections to the at least one web server along with a trigger to increase the number of allocated connections to the updated number of connections.

In addition (or in the alternative) to the acts described above, some embodiments, include a step for dynamically increasing the number of allocated connections for the web server. The methods and acts described in relation to FIGS. 2-3B can comprise the corresponding acts for performing a step for dynamically increasing the number of allocated connections for the web server.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 8:
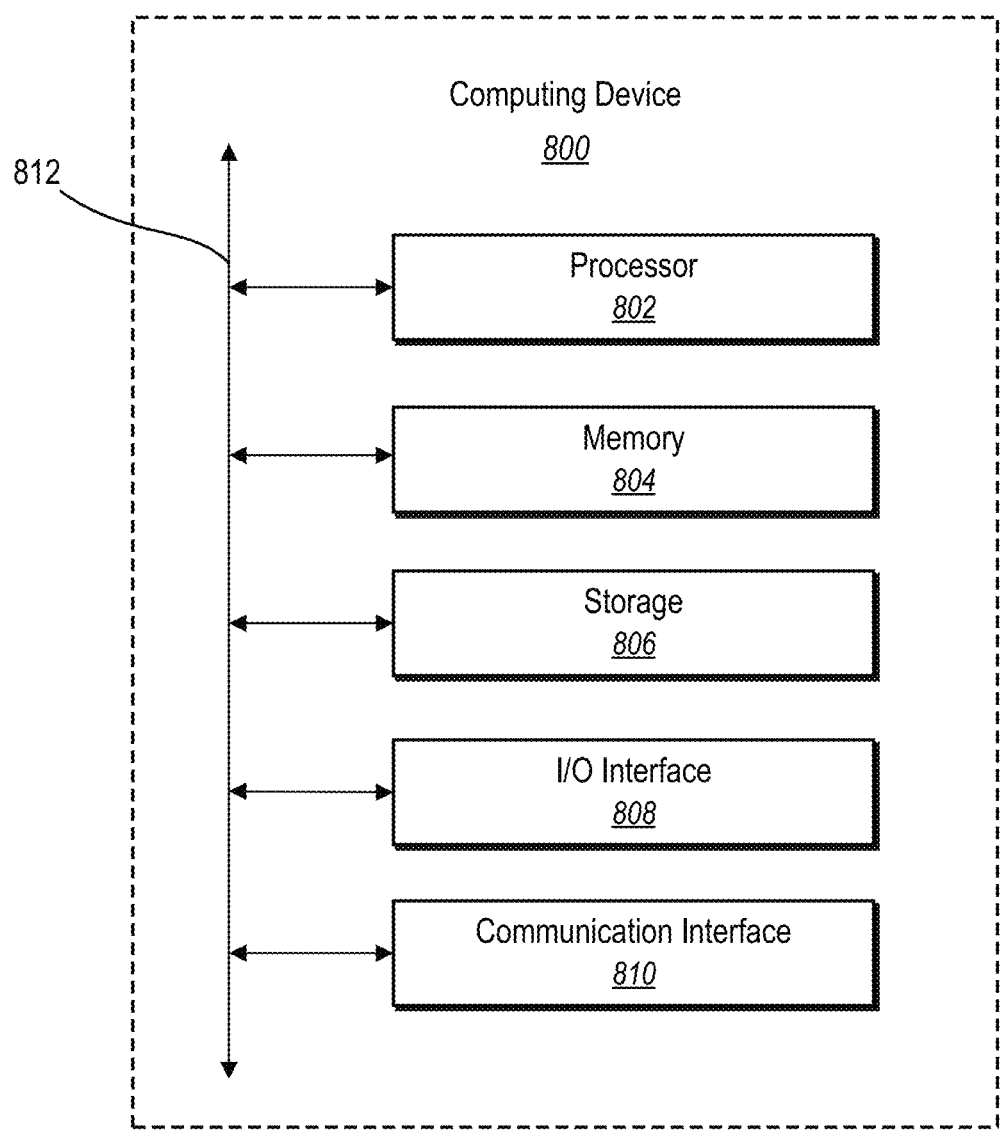
FIG. 8 illustrates a block diagram of an example computing device for implementing one or more embodiments of the present disclosure.

FIG. 8 illustrates a block diagram of an example computing device 800 that may be configured to perform one or more of the processes described above. One will appreciate that one or more computing devices, such as the computing device 800 may represent the computing devices described above (e.g., such as the web servers 102a-102n, application server 110, or web server management device 114). In one or more embodiments, the computing device 800 may be a mobile device (e.g., a mobile telephone, a smartphone, a PDA, a tablet, a laptop, a camera, a tracker, a watch, a wearable device, etc.). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of computing device 800 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium storing instructions thereon that, when executed by at least one processor, cause one or more computing devices to:
   determine a number of allocated connections and a corresponding allocated memory for a web server, wherein the number of allocated connections comprises a number of possible connections available to the web server based on the allocated memory;
   identify an increase in a number of ongoing connections for the web server over a first time period;
   determine, based on historical request trends and the identified increase, a predicted number of connections over a second time period;
   determine that the predicted number of connections exceeds a predetermined threshold relative to the number of allocated connections for the web server; and
   dynamically increase, based on the predicted number of connections exceeding the predetermined threshold, the number of allocated connections and the corresponding allocated memory for the web server without restarting the web server.

2. The non-transitory computer readable medium of claim 1, wherein the instructions when executed by at least one processor, cause the one or more computing devices to dynamically increase the number of allocated connections and the corresponding allocated memory for the web server by:
  allocating additional memory for new connections;
  copying ongoing connections to the new connections;
  de-allocating memory previously utilized for the ongoing connections; and
  initialize new unused connections.

3. The non-transitory computer readable medium of claim 1, wherein the instructions when executed by at least one processor, cause the one or more computing devices to dynamically increase the number of allocated connections for the web server by dynamically altering a number of allocated connections indicated in non-persistent memory of the web server.

4. The non-transitory computer readable medium of claim 3, wherein the instructions when executed by at least one processor, cause the one or more computing devices to dynamically increase the number of allocated connections for the web server without altering a number of allocated connections stored in persistent memory of the web server.

5. The non-transitory computer readable medium of claim 1, further comprising instructions that, when executed by the at least one processor, cause the one or more computing devices to determine, based at least on the number of ongoing connections for the web server and historical load data, an updated number of connections for the web server.

6. The non-transitory computer readable medium of claim 5, wherein the instructions when executed by at least one processor, cause the one or more computing devices to dynamically increase the number of allocated connections for the web server by sending the updated number of connections to the web server along with a trigger to increase the number of allocated connections for the web server to the updated number of connections.

7. The non-transitory computer readable medium of claim 1, further comprising instructions that, when executed by the at least one processor, cause the one or more computing devices to identify the increase in a number of ongoing connections for the web server over a first time period by receiving, from a scheduler at the web server, a number of ongoing connections or requests for connections.

8. The non-transitory computer readable medium of claim 1, further comprising instructions that, when executed by the at least one processor, cause the one or more computing devices to:
  receive, via a graphical user interface, one or more user settings; and
  determine, based on the one or more user settings, the predetermined threshold.

9. A system comprising:
  at least one web server;
  at least one application server;
  at least one processor; and
  at least one non-transitory computer-readable storage medium storing instructions thereon that, when executed by the at least one processor, cause the system to:
  monitor, at the at least one web server, a number of ongoing connections and a corresponding allocated memory for the at least one web server, wherein a number of allocated connections comprises a number of possible connections available to the web server based on the allocated memory;
  determine, based on historical request trends and the monitored number of ongoing connections, a predicted number of connections;
  determine that the predicted number of connections exceeds a predetermined threshold relative to the number of allocated connections for the at least one web server; and
  dynamically increase the number of allocated connections and the corresponding allocated memory for the at least one web server by initializing a set of new connections and copying the ongoing connections to new connections of the set of new connections.

10. The system of claim 9, wherein the instructions, when executed by the at least one processor, cause the system to dynamically increase the number of allocated connections automatically in response to an increase in the number of ongoing connections.

11. The system of claim 9, wherein the instructions, when executed by the at least one processor, cause the system to monitor the number of ongoing connections for the at least one web server by:
  determining the number of ongoing connections repeatedly at a first time interval;
  determining a high number of ongoing connections during a second time interval from the numbers of ongoing connections determined at the first time interval, the second time interval being longer than the first time interval; and
  reporting the high number of ongoing connections repeatedly at the second time interval for use in determining the predicted number of connections.

12. The system of claim 11, further comprising instructions that, when executed by the at least one processor, cause the system to:
  determine that a first number of ongoing connections determined at the first time interval is within a predetermined percentage of the number of allocated connections for the at least one web server; and
  report the first number of ongoing connections prior to the second time interval for use in determining the predicted number of connections.

13. The system of claim 11, wherein reporting the high number of ongoing connections comprises sending, by a scheduler at the at least one server, the high number of ongoing connections to the at least one application server.

14. The system of claim 11, further comprising instructions that, when executed by the at least one processor, further cause the system to detect a change in the health of the at least one web server, and wherein the predicted number of connections over the second time interval is further based on the change in the health of the at least one web server.

15. The system of claim 9, wherein the instructions, when executed by the at least one processor, cause the system to dynamically increase the number of allocated connections for the at least one web server without restarting the at least one web server or interrupting the ongoing connections.

16. The system of claim 9, wherein the instructions when executed by at least one processor, cause the system to dynamically increase the number of allocated connections for the at least one web server by sending, from the at least one application server, an updated number of connections to the at least one web server along with a trigger to increase the number of allocated connections to the updated number of connections.

17. A method comprising:
- determining a number of allocated connections for a web server;
- detecting an increase in a number of ongoing connections for the web server over a first time period;
- determining, based on historical request trends and the detected increase, a predicted number of connections over a second time period;
- determining that the predicted number of connections exceeds a predetermined threshold relative to the number of allocated connections for the web server; and
- performing a step for dynamically increasing the number of allocated connections for the web server.

18. The method of claim 17, further comprising determining, based at least on the number of ongoing connections for the web server and historical load data, an updated number of connections for the web server.

19. The method of claim 17, further comprising:
- receiving, via a graphical user interface, one or more user settings; and
- determining, based on the one or more user settings, the predetermined threshold.

20. The method of claim 17, wherein the predetermined threshold relative to the number of allocated connections for the web server is a predetermined threshold for a difference between the number of allocated connections and the predicted number of connections over the second time period.

* * * * *